(12) United States Patent
Ebina et al.

(10) Patent No.: US 8,647,744 B2
(45) Date of Patent: Feb. 11, 2014

(54) GRAPHITE CLAY COMPOSITE MATERIAL, PROCESS FOR PRODUCING THE SAME, GASKET OR PACKING COMPRISING THE COMPOSITE MATERIAL, AND CLAY DISPERSION USED FOR THE COMPOSITE MATERIAL

(75) Inventors: Takeo Ebina, Sendai (JP); Yasuhisa Hasegawa, Sendai (JP); Fujio Mizukami, Ushiku (JP); Nobuhiko Teshima, Osaki (JP); Katsuro Tsukamoto, Takarazuka (JP)

(73) Assignee: National Institute of Advanced Industrial Science and Technology, Osaka (JP)

( * ) Notice: Subject to any disclaimer, the term of this patent is extended or adjusted under 35 U.S.C. 154(b) by 1234 days.

(21) Appl. No.: 12/296,107
(22) PCT Filed: Apr. 3, 2007
(86) PCT No.: PCT/JP2007/057485
§ 371 (c)(1), (2), (4) Date: Jul. 26, 2009
(87) PCT Pub. No.: WO2007/114443
PCT Pub. Date: Oct. 11, 2007

(65) Prior Publication Data
US 2009/0295103 A1   Dec. 3, 2009

(30) Foreign Application Priority Data
Apr. 5, 2006 (JP) .................. 2006-104102

(51) Int. Cl.
*F16J 15/06* (2006.01)
*B32B 9/04* (2006.01)
*B32B 5/00* (2006.01)
*B32B 3/02* (2006.01)

(52) U.S. Cl.
USPC ....... 428/408; 428/333.2; 428/66.4; 428/222; 277/650; 427/443.2; 156/60

(58) Field of Classification Search
USPC .................. 428/408, 332, 66.4, 222
See application file for complete search history.

(56) References Cited

U.S. PATENT DOCUMENTS 1,973,004 A * 9/1934 Langworthy et al. ......... 428/609
(Continued)

FOREIGN PATENT DOCUMENTS

CN     1227186     9/1999
(Continued)

OTHER PUBLICATIONS

Machine_English_Translation_JP_11351400_A; Sadao Watanabe; Compound Sheet for Gasket and Compound Gasket Using the Compound Sheet; Dec. 24, 1999; JPO; whole document.*

(Continued)

*Primary Examiner* — David Sample
*Assistant Examiner* — Tahseen N Khan
(74) *Attorney, Agent, or Firm* — Mark M. Friedman

(57) ABSTRACT

To provide a composite that can find application to various uses in a wide spectrum of fields, for example, sealing members, such as a joint sheet, a gasket and a packing, for use in junction portions, etc. of pipings of power plant and chemical plant, radiation sheets, electromagnetic wave shielding members, soundproof sheets, etc., and provide a process for producing the composite; a gasket or packing based on the composite and a clay dispersion liquid used for the composite. There is provided a composite composed mainly of graphite and clay and having the structure of graphite laminated with and/or impregnated with clay. The composite is produced by subjecting an exfoliated graphite sheet or film or a molding therefrom to coating with and/or immersion in a clay dispersion liquid with clay particles dispersed therein, or by laminating together of an exfoliated graphite sheet and/or film and a sheet and/or film composed mainly of clay. Further, a gasket or packing is produced by molding the composite.

29 Claims, 11 Drawing Sheets

(56) References Cited

U.S. PATENT DOCUMENTS

| | | | |
|---|---|---|---|
| 4,477,094 A * | 10/1984 | Yamamoto et al. | 277/592 |
| 6,458,418 B2 * | 10/2002 | Langer et al. | 427/376.1 |
| 2004/0121152 A1 * | 6/2004 | Toas | 428/374 |
| 2005/0165151 A1 * | 7/2005 | Fujiwara et al. | 524/449 |
| 2007/0015267 A1 * | 1/2007 | Da Silva et al. | 435/182 |
| 2007/0027248 A1 * | 2/2007 | Ebina et al. | 524/445 |

FOREIGN PATENT DOCUMENTS

| | | |
|---|---|---|
| CN | 1444628 | 9/2003 |
| DE | 3820928 | 2/1989 |
| DE | 19853472 | 5/2000 |
| DE | 69814051 | 2/2004 |
| DE | 102005019250 | 9/2006 |
| EP | 640782 A1 * | 3/1995 |
| EP | 1679285 | 7/2006 |
| FR | WO2005035463 | 4/2005 |
| JP | 3265762 | 11/1991 |
| JP | 04347068 | 2/1992 |
| JP | 07309976 | 11/1995 |
| JP | 9280379 | 10/1997 |
| JP | 10279921 | 10/1998 |
| JP | 111001347 | 4/1999 |
| JP | 11351399 | 12/1999 |
| JP | 11351400 | 12/1999 |
| JP | 11351400 A * | 12/1999 |
| JP | 2000034467 | 2/2000 |
| JP | 2000091453 | 3/2000 |
| JP | 2002267019 | 9/2002 |
| JP | 2004035804 | 2/2004 |
| JP | 2005201363 | 7/2005 |
| JP | 2005240956 | 9/2005 |
| JP | 2006057099 | 3/2006 |
| WO | WO9910598 | 3/1999 |
| WO | WO2004033538 | 4/2004 |
| WO | WO2005023714 | 3/2005 |
| WO | WO 2005023714 A1 * | 3/2005 |

OTHER PUBLICATIONS

Onikata Masanobu, Kondo Mitsuji, *Clay Science*, vol. 9, No. 5 299-310 (1995).

\* cited by examiner (a)

(b)

(c)

(d)

(a)

(b)

(c)

(d)

(e)

(a)

(b)

GRAPHITE CLAY COMPOSITE MATERIAL, PROCESS FOR PRODUCING THE SAME, GASKET OR PACKING COMPRISING THE COMPOSITE MATERIAL, AND CLAY DISPERSION USED FOR THE COMPOSITE MATERIAL

CROSS REFERENCE TO RELATED APPLICATIONS

This application is International Application No. PCT/JP2007/057485, filed on Apr. 3, 2007, which claims priority of Japanese Patent Application No. 2006-104102, filed on Apr. 5, 2006, the entire content and disclosure of the preceding applications are incorporated by reference into this application.

BACKGROUND OF THE INVENTION

1. Field of the Invention

The present invention relates to a graphite clay composite material, a process for producing the same, a gasket or packing comprising the composite material, and a clay dispersion used for the composite material. More particularly, the graphite clay has essential properties to be used for the gasket or packing such as; heat resistance, durability, barrier (sealing) property or corrosion resistance against a fluid such as a gas or liquid, and furthermore, heat-releasing property, electromagnetic wave shielding property and mechanical strength and the like.

2. Description of the Related Art

In sealing materials such as a joint sheet, gasket, packing and the like, which were used in a connection part of pipes and the like in power plants and chemical plants, asbestos products have been used, neverthless asbestos causes serious health damages. Therefore it is urgent and important developing an alternative materials of asbestos. It is required for the asbestos-replacing materials to have not only high heat resistance and durability but also airtightness and bendability, and furthermore, applicability in wide temperature ranges as well.

Meanwhile, in the field of electronic devices such as computer, CPU, power transistor and the like, a heat releasing sheet for rapidly releasing the heat generated from devices or components, or a shielding sheet for shielding electromagnetic wave from outside are essential components in order to avoid troubles caused by heat and electromagnetic wave. Therefore, materials having superior heat-releasing or electromagnetic wave shielding property are required.

The present invention aims to improve the above situations. Also, the present invention is a new non-asbestos material that replaces asbestos, and has superior heat resistance, durability, sealing property, oxygen resistance, and furthermore, bendability as well. The present invention relates to preferably used for a joint sheet, gasket, packing and the like. The present invention also has heat releasing and electromagnetic wave shielding properties and provides a new material and new technology that are applied to a heat-releasing sheet and an electromagnetic wave shielding sheet.

Currently, commercially available joint sheet, gasket and packing to replace those based on asbestos are based on an organic polymeric material such as rubber, PTFE, aramid and the like, obtained by processing natural or synthetic mineral such as mica, vermiculite and the like into a sheet-like form, made from a metal sheet or a expanded graphite sheet in which a graphite is highly compressed and the like.

However, the product based on an organic polymeric material does not have enough gas barrier property and sealing property while it has a superior bendability. Besides, the product has a problem in heat resistance that the operating temperature is generally up to about 250° C.

In contrast, the mineral product has a high heat resistance and it may be used as a gas seal component such as a gland packing and the like. However, the product is unable to completely block a pass where a small gas molecule flows because of the difficulty in achieving a high density formation. This means gas seal property in the product of mineral is not very high.

The processed product of sheet metal has a superior sealing property and heat resistance. It can also be used in a low temperature range up to 0° C. so that it can be widely applied in several parts like a connection part and the like. However, a metal seal requires a mechanism that tightens the seal and a contact surface may be cracked when the seal is tightened, which may cause a leakage. There are also some problems in the handling. For example, when heating and cooling, the metal seal cannot accommodate the volume change of a peripheral component so that a gap is generated. This results in the leakage or electronic insulation failure.

In contrast, the expanded graphite has a high electrical conductivity as well as a superior alkali resistance and water resistance. The expanded graphite sheet is widely used as a sealing material such as a gasket or packing and the like because of its superiority in heat resistance, flexibility, compression recovery and the like (e.g. Japanese patent publication Tokkai 2005-201363). It is also used as a heat releasing sheet and electromagnetic wave shielding sheet (e.g. Japanese patent publication Tokkai 2000-91453, PCT publication WO99/10598). However it is poor in a mechanical strength such as bending strength, tension strength and the like.

Also, the sealing property of the expanded graphite sheet is not sufficient for sealing gas and organic vapor while it has high heat resistance (gas: about 400° C., liquid: about 600° C.). For example, there is a problem that the present expanded graphite gasket is not applicable for the component used under presence of high temperature oxygen, because it starts oxidation at 500° C. and the expanded graphite sublimates at 600° C. in the presence of oxygen, and the sealing property is lost. Further, there are other problems in handling the present expanded graphite gasket such as; inapplicability to a part where insulation property is required due to its high electrical conductivity, vulnerability to electrolytic corrosion, sensitiveness to strong acid and so on. Moreover, the graphite powder is contaminated in the fluid inside a pipe as an impurity or contaminant, because the graphite sticks to a flange material and the graphite powder easily falls in the fluid.

These days, the expanded graphite is composited with the other material to solve the above-described problems of the expanded graphite sheet. One example is a composite material laminating the expanded graphite sheet with a metal material to reinforce the mechanical strength of the expanded graphite (e.g. Japanese patent publication Tokkai H11-351400). However, such a composite material does not improve the corrosion resistance although it increases the mechanical strength. Even more, no insulation property is expected. The problems of the present expanded graphite composite material are still remained, or is only partly improved and patchworked for its solution. Thus the usage and application of the conventional graphite composite material are limited.

Considering the above situation, the present inventors searched widely substances and materials. As a result, the present inventors found a composition of the clay and graphite improved or newly obtained a mechanical strength, heat resistance, corrosion resistance, gas barrier property, acid resistance, insulation property and the like as well as keeping various superior properties the graphite originally had such as; flexibility, heat conductivity, electrical conductivity, electromagnetic wave shielding property, alkali resistance, water resistance and the like. That is, the present invention provides a graphite clay composite material, process for producing the same, a gasket or packing comprising the composite material, and a clay dispersion used for the composite material. The above-described graphite clay composite can be applied to a wide variety of fields and has a high versatility. The wide variety of fields are, for example, a sealing material such as; joint sheet, gasket, packing and the like used for a connection part of pipes and the like in power plants and chemical plants, heat-release sheet, electromagnetic wave shielding material, sound-proof sheet and the like.

SUMMARY OF INVENTION

One embodiment of the present invention relates to a composite material comprising mainly a graphite and a clay, wherein the clay is laminated on and/or enters into a graphite layer.

Another embodiment of the present invention relates to the composite material, wherein the graphite is an expanded graphite, wherein the clay is at least one selected from natural clay, synthetic clay or modified clay.

Yet another embodiment of the present invention relates to the composite material, wherein the clay is at least one selected from mica, vermiculite, montmorillonite, beidellite, saponite, hectorite, stevensite, magadiite, ilerite, kanemite, illite, sericite or nontronite.

Another embodiment of the present invention relates to the composite material, wherein the expanded graphite is a sheet and/or film or a formation obtained from the sheet and/or film, wherein the expanded graphite is coated with the clay.

Another embodiment of the present invention relates to the composite material, wherein the modified clay includes one selected from quaternary ammonium cation, quaternary ammonium phosphonium, imidazolium cation or pyridium as an organic cation.

Another embodiment of the present invention relates to the composite material, wherein the modified clay is formed by reacting the clay with a silylation agent.

Another embodiment of the present invention relates to the composite material, wherein a composition rate of the organic cation in the modified clay is less than 30% by weight.

Another embodiment of the present invention relates to the composite material, wherein a composition rate of the silylation agent in the clay and silylation agent is less than 30% by weight.

Another embodiment of the present invention wherein an expanded graphite layer and/or a clay layer are laminated 2 layers or more.

Another embodiment of the present invention relates to the composite material, comprising; a sheet and/or film laminating at least one of each of a sheet and/or film of the expanded-graphite and a clay based sheet and/or film (the clay is the main ingredient); or a formation obtained from the sheet and/or film.

Another embodiment of the present invention relates to the composite material, wherein the clay based sheet and/or film includes the clay, or the clay and an additive.

Another embodiment of the present invention relates to the composite material, wherein the additive is at least one selected from celluloid, phenol resin, alkyd resin, urea resin, cellulose acetate, polyvinyl acetate resin, acrylate resin, styrene resin, vinyl chloride resin, melamine resin, polyethylene resin, polyurethane resin, vinylidene chloride resin, polyamide resin, unsaturated polyester, silicon resin, acrylonitrile-styrene resin, fluorine resin, epoxide resin, diallyl phthalate resin, acrylonitrile-butadiene-styrene resin, polyethylene terephthalate, polypropylene, polycarbonate, polyacetal, polyimide, polysulphone, polyphenylene ether, polybutylene terephthalate, polyether sulfone, liquid-crystal polymer, polyphenylene sulfide, polyetherimide.

Another embodiment of the present invention relates to The composite material, wherein a red phosphorus and an aluminum hydroxide are added in the range from 1.5 to 10% by weight with respect to graphite 100% by weight, respectively.

Another embodiment of the present invention relates to a gasket or packing comprising the composite material.

Another embodiment of the present invention relates to the gasket or packing, having a water-resistance coating.

Another embodiment of the present invention relates to the gasket or packing, including a thin metal sheet.

Another embodiment of the present invention relates to the gasket or packing, wherein the sheet metal comprises a stainless-steel and has a thickness of 0.05 to 5 mm.

Another embodiment of the present invention relates to the gasket or packing, wherein the gasket is a sheet gasket.

Another embodiment of the present invention relates to the gasket or packing, wherein the gasket or packing is processed by a grommet processing.

Another embodiment of the present invention relates to the gasket or packing, wherein a leakage rate of helium gas is 1.62 mL/min or less after the steps of: disposing the sheet gasket (JPI 50A: outside diameter $\Phi$104 mm, inside diameter $\Phi$61.5 mm, thickness 3 mm) between two flanges; tightening the sheet gasket with a tightening surface pressure of 29.4 MPa; and pressurizing the sheet gasket with an internal pressure of 0.98 MPa.

Another embodiment of the present invention relates to the gasket or packing, wherein the gasket is a sphere gasket.

Another embodiment of the present invention relates to the gasket or packing, wherein the sphere surface includes a boron nitride, a talc and a tetrafluoroethylene.

Another embodiment of the present invention relates to the gasket or packing, wherein a weight decrease rate is 11% or less after heating for 24 hours at 800° C.

Another embodiment of the present invention relates to the gasket or packing, wherein a leakage rate of air is 0.5 L/30 sec or less after the steps of: disposing the sphere gasket (outside diameter $\Phi$70 mm, inside diameter $\Phi$53.5 mm, height 16 mm) between flanges respectively formed in the vicinity of the tip of two pipes (stainless-steel, outside diameter $\Phi$53 mm); tightening the sphere gasket with a tightening load of 588.4N; heating the inside of the pipe for 24 hours to rise the temperature of the flange sphere surface up to 600 to 700° C.; sliding a movable part of the flange sphere surface for 10 times in the same movable area as before the heating repeatedly; and pressurizing the sphere gasket with an internal pressure of 19.6 kPa.

Another embodiment of the present invention relates to the gasket or packing, wherein the two pipes are able to be folded at the junction of flanges after the steps of: disposing the sphere gasket (outside diameter $\Phi$ 70 mm, inside diameter $\Phi$53.5 mm, height 16 mm) between flanges formed in the vicinity of the tip of two pipes (stainless-steel, outside diameter $\Phi$ 53 mm) respectively; tightening the sphere gasket with a tightening load of 588.4N; and heating the inside of the pipe for 24 hours to rise the temperature of the flange sphere surface up to 600 to 700° C.

Another embodiment of the present invention relates to the gasket or packing, wherein the gasket is a spiral gasket.

Another embodiment of the present invention relates to the gasket or packing, wherein the packing is a braided packing.

Another embodiment of the present invention relates to a clay dispersion for manufacturing the gasket or packing, wherein the clay is uniformly dispersed in a solvent mainly comprising water.

Another embodiment of the present invention relates to the clay dispersion, wherein the additive is uniformly dispersed or dissolved.

Another embodiment of the present invention relates to the clay dispersion, wherein the clay has a solid content of 3 to 15% by weight.

Another embodiment of the present invention relates to a method for manufacturing a composite material, comprising the steps of: applying a clay dispersion including clay particles to a sheet and/or film of an expanded graphite or a formation obtained from the sheet and/or film; and/or soaking the sheet and/or film of the expanded graphite or the formation obtained from the sheet and/or film in the clay dispersion so that the clay is laminated on and/or enters into the expanded graphite.

Another embodiment of the present invention relates to the method for manufacturing a composite material, wherein the clay dispersion comprises at least one selected from natural clay, synthetic clay or modified clay.

Another embodiment of the present invention relates to the method for manufacturing a composite material, wherein the clay dispersion comprises water or an organic solvent.

Another embodiment of the present invention relates to a method for manufacturing a composite material, comprising; sticking and laminating the sheet and/or film of the expanded graphite and the clay based sheet and/or film together.

Another embodiment of the present invention relates to a method for manufacturing a composite material, where in the sticking is carried out by a cold and/or hot press.

Another embodiment of the present invention relates to a method for manufacturing a composite material, wherein the sticking is carried out by a mill roll.

The composite of the present invention comprises a graphite and a clay so that it can maintain various superior properties of the graphite such as; flexibility, heat conductivity, electrical conductivity, electromagnetic wave shielding property, alkali resistance, water resistance which the graphite originally has. At the same time, the clay can enhance or newly add properties to the composite material such as; mechanical strength, heat resistance, corrosion resistance, gas barrier property, acid resistance, insulation property, which are the drawback of the graphite.

Therefore, the present invention provides the a highly versatile graphite clay composite which can be obtained which can be applied to various usages in a wide field including a field that has a difficulty in applying the existing graphite sheet such as; sealing material such as joint sheet, gasket, packing and the like used for a connection part and the like of pipes in power plants and chemical plants, heat-release sheet, electromagnetic wave shielding material, sound-proof sheet and the like.

Also, the gasket or packing of the present invention comprises the composite material having the above property so that it can exhibit a superior heat resistance, sealing property and corrosion property. It can be preferably used in a connection part of pipes in power plants and chemical plants because the graphite powder falling and sticking (seizing) to a flange surface do not occur.

Further, the clay dispersion of the present invention can be used to manufacture the composite material having the above-described superior properties because the clay is uniformly dispersed in a solvent mainly comprising water.

BRIEF DESCRIPTION OF THE DRAWINGS

Hereinafter, the preferred embodiments of a graphite clay composite material, a process for producing the same, gasket or packing comprising the composite material, and a clay dispersion used for the composite material according to the present invention are explained by referring to drawings.

DETAILED DESCRIPTIONS

Figure 1:
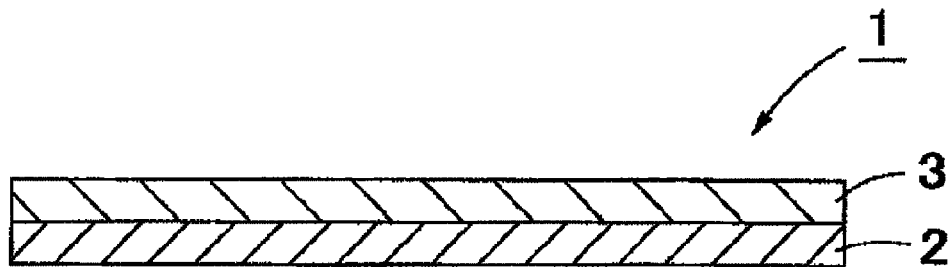
FIG. 1 is a schematic cross sectional view of a composite material in the first embodiment of the present invention.

The graphite clay composite material (hereinafter "composite material") according to the present invention includes a graphite and a clay as main ingredients, and the clay is laminated on and/or enters into a graphite layer. Natural graphite and/or artificial graphite may be used as a graphite. At least one of vein graphite, amorphous graphite and expanded graphite may be used as a natural graphite. It is preferable to use the expanded graphite which is superior in a heat resistance, flexibility, compression recovery and the like herein. For this reason, examples using the expanded graphite will be explained as below, but it is also possible to use the above-described graphite instead of or in addition to the expanded graphite.

At least one of natural clay, synthetic clay and modified clay may be used as a clay.

More particularly, at least one selected from mica, vermiculite, montmorillonite, beidellite, saponite, hectorite, stevensite, magadiite, ilerite, kanemite, illite, sericite or nontronite may be preferably used.

The modified clay used herein may be natural or synthetic clay. Preferably, at least one selected from mica, vermiculite, montmorillonite, beidellite, saponite, hectorite, stevensite, magadiite, ilerite, kanemite, illite, sericite are exemplified. More preferably, any of these natural or synthetic clays or mixture thereof is exemplified.

An organic cation for modified clay used herein is exemplified which includes quaternary ammonium cation or quaternary phosphonium cation. In this case, the composition rate of the organic cation in the modified clay is less than 30% by weight.

A modified clay reacted with a silylation agent can be used herein. In this case, a composition rate of the silylation agent in the total weight of the clay and the silylation agent is less than 30% by weight.

An organic in the modified clay used herein includes organics such as; quaternary ammonium cation, quaternary phosphonium cation, imidazolium cation and pyridium cation and so on. The quaternary ammonium cation may be exemplified but not limited to the following such as; dimethyloctadecyl type, dimethylstarylbenzyl type and trimethylstaryl type. The quaternary phosphonium cation is also exemplified as a similar organic. These organics are introduced into the clay by an ion exchange of a raw clay.

This ion exchange, for example, requires the following processes, dispersing the raw clay in the water in which the large excess of the organic is dissolved, stirring for a given time, separating solids and liquids by a centrifugation or filtration, and washing with water repeatedly. These ion exchange processes can be performed only one time or repeatedly. Repeating the above processes, an exchangeable ion in the clay (e.g. natrium and calcium) is exchanged with the organic in a high rate. A variety of organic and exchange rate allows the modified clay to have polarity with different variations. The modified clays with different polarities preferably require different additives and solvents respectively. In this case, quaternary ammonium cation chloride is generally used as a reagent to introduce the quaternary ammonium cation. Although chlorine which is mixed at the same time as introduction of quaternary ammonium cation is diluted by water washing, it may be difficult to keep the chlorine concentration at 150 ppm or less by repeating water washing. For some an electronics use and the like, however, no contamination of chlorine is allowed. For that reason, a chlorine concentration has to be 150 ppm or less. In such a case, other reagents including no chlorine such as quaternary ammonium bromide or quaternary ammonium cation hydroxide, should be used instead of the quaternary ammonium cation chloride.

The silylation agent in the modified clay used herein is exemplified but is not be limited to the following substances such as; methyltrimethoxysilane, methyltriethoxysilane, propyltrimethoxysilane, butyltrimethoxysilane, hexyltrimethoxysilane, octyltrimethoxysilane, dodecyltrimethoxysilane and octadecyltrimethoxysilane. A method for introducing the silylation agent into the clay is described but not limited to the following method. For example, the raw clay and the silylation agent (2% by weight to the raw clay) are mixed and milled by a ball mill for an hour. (ONIKATA Masanobu, KONDO Mitsuji, Clay Science, Vol. 9, No. 5, 299-310 (1995))

The modified clay used herein may be manufactured to have a various kinds of polarity depending on the processing methods. The modified clay requires different preferable solvents to manufacture the clay dispersion depending on the polarities. The solvent for manufacturing the clay dispersion may be alcohol, ether, acetic ether, toluene and the like, for example.

FIGS. 1 to 5 are schematic cross sectional views of the first to fifth embodiments of the composite material respectively according to the present invention.

Composite materials (1) of the first to fifth embodiments are laminated with a clay layer (3) on an expanded graphite layer (2).

The composite material (1) of the first embodiment shown in FIG. 1 is a double-layer structure laminated with the clay layer (3) on one side of the expanded graphite layer (2).

Figure 2:
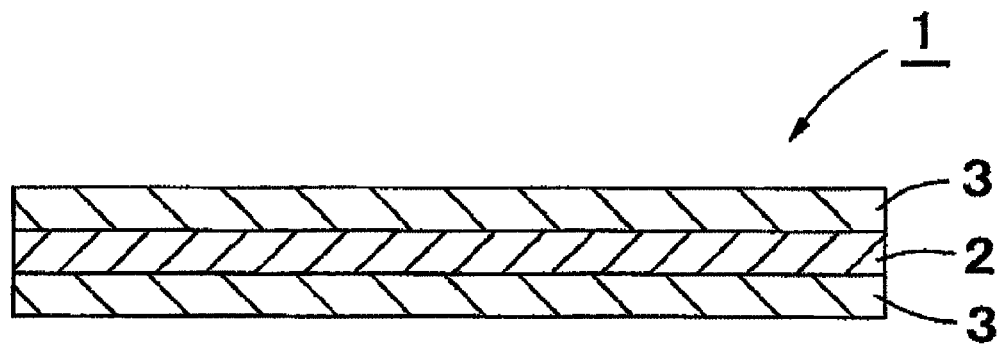
FIG. 2 is a schematic cross sectional view of a composite material in the second embodiment of the present invention.
Figure 3:
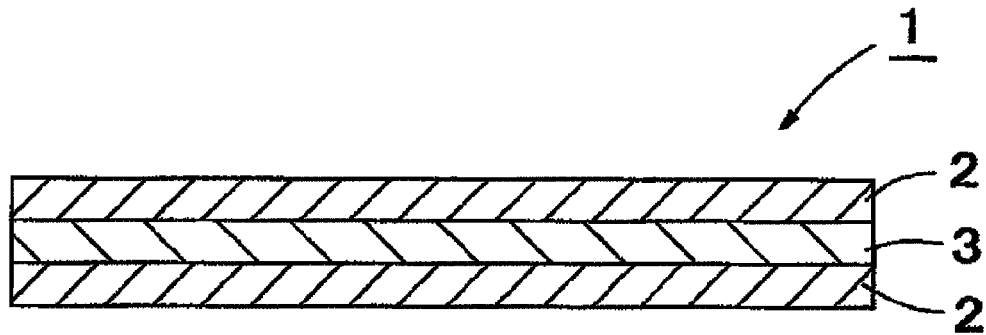
FIG. 3 is a schematic cross sectional view of a composite material in the third embodiment of the present invention.

The composite materials (1) of the second and third embodiments shown in FIGS. 2 and 3 respectively are triple-layer structures. The composite material (1) of the second embodiment is laminated with the clay layers (3) on both sides of the expanded graphite layer (2). The composite material (1) of the third embodiment is laminated with the expanded graphite layers (2) on both sides of the clay layer (3).

Figure 4:
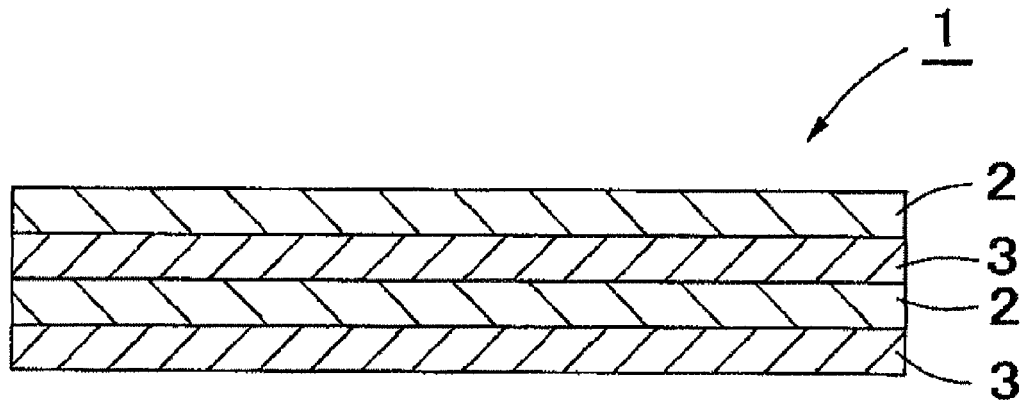
FIG. 4 is a schematic cross sectional view of a composite material in the fourth embodiment of the present invention.

The composite material (1) of the fourth embodiment shown in FIG. 4 is four or more-layer structure (four-layer structure in FIG. 4) interlaminated with the expanded graphite layer (2) and the clay layer (3).

In the fourth embodiment, numbers of both the expanded graphite layer (2) and the clay layer (3) are not limited and can be optionally set two or more layers respectively.

Figure 5:
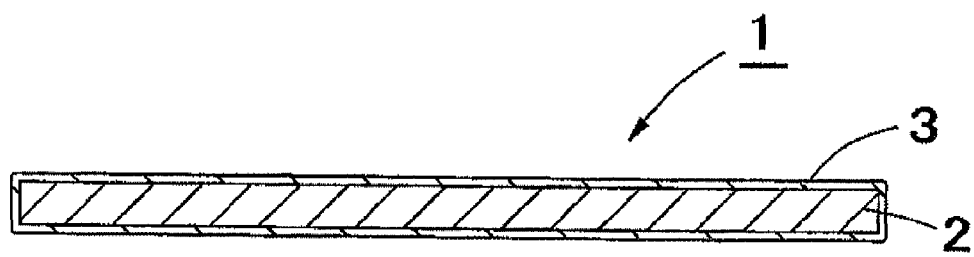
FIG. 5 is a schematic cross sectional view of a composite material in the fifth embodiment of the present invention.

The composite material (1) of the fifth embodiment shown in FIG. 5 has the expanded graphite layer (2) wholly coated with clay layer (3).

In the fifth embodiment, numbers of both the expanded graphite layer (2) and the clay layer (3) are also not limited and any one of the structures such as; two or more-layer expanded graphite layer (2) coated with a single clay layer (3), a single expanded graphite layer (2) coated with two or more-layer clay layer (3), and two or more-layer expanded graphite layer (2) coated with two or more-layer clay layer (3) may be applicable.

Figure 6:
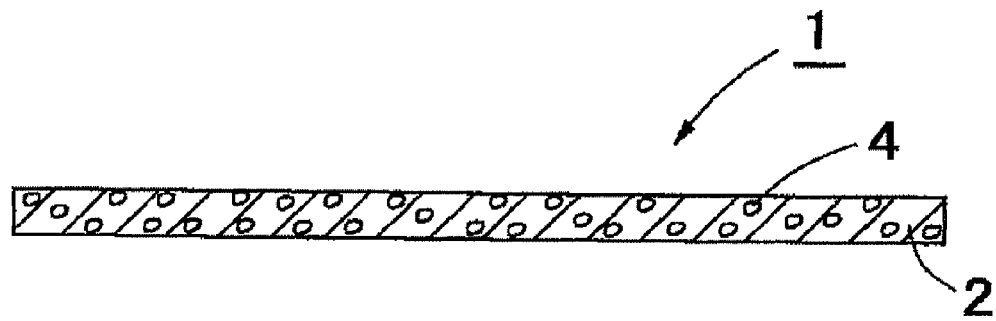
FIG. 6 is a schematic cross sectional view of a composite material in the sixth embodiment of the present invention.

FIG. 6 is a schematic cross sectional view of the composite material in the sixth embodiment according to the present invention.

The composite material (1) of the sixth embodiment includes the expanded graphite layer (2) which a clay particle (4) enters therein.

Figure 7:
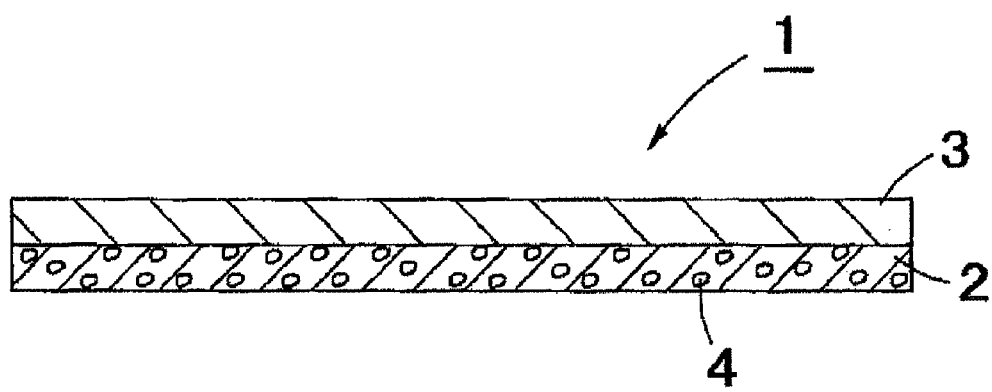
FIG. 7 is a schematic cross sectional view of a composite material in the seventh embodiment of the present invention.

FIG. 7 is a schematic cross sectional view of the composite material of the seventh embodiment according to the present invention.

The composite material (1) of the seventh embodiment includes a laminated body of the expanded graphite layer (2) and the clay layer (3) in the above described first to fifth embodiments. A clay particle (4) enters inside of the expanded graphite layer (2) in the laminated body.

In FIG. 7, the laminated body in the first embodiment is shown as an example for the laminated body of the expanded graphite layer (2) and the clay layer (3). However, it is possible to use the laminated body in the second to fifth embodiments instead.

Figure 8:
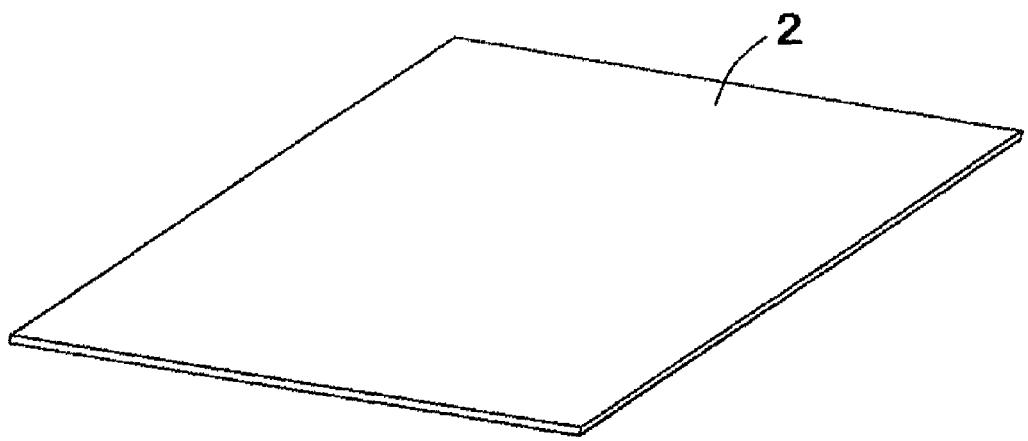
FIG. 8 is one example of an expanded graphite layer in a composite material of the present invention, which is formed into a sheet-like or film-like form.
Figure 9:
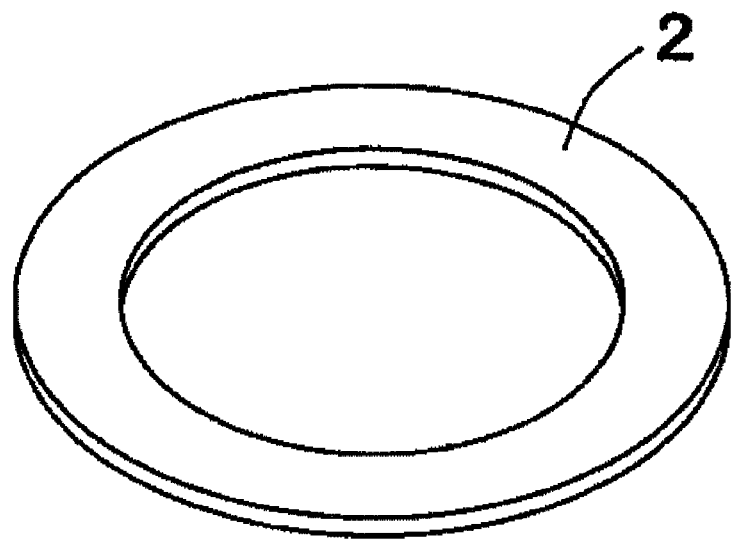
FIG. 9 is one example of an expanded graphite layer in a composite material of the present invention, which is a formation obtained from forming with a sheet-like or film-like form.

In the above-described composite material (1) of the first to seventh embodiments, the expanded graphite layer (2) is a sheet and/or film shown in FIG. 8 or a formation (e.g. see FIG. 9) obtained by forming the sheet and/or film.

The sheet or film comprising the expanded graphite layer (2) can be obtained from the following known processes. First, the graphite powder such as natural graphite, pyrolytic graphite, kish graphite and the like is reacted with concentrated sulfuric acid, concentrated nitric acid or the like to produce an intercalation compound. After that, the intercalation compound is washed by water and the obtained residual compound is heated immediately and expanded to obtain the expanded graphite. The expanded graphite is formed with a mill roll to make a sheet or film-like form with flexibility.

A thickness of the sheet or film comprising the expanded graphite layer (2) is not limited but preferably about 0.10 to 1.5 mm.

One reason for this is when the thickness is less than 0.10 mm, sufficient strength may not be provided so that the sheet or film may be fractured. The other reason is when the thickness is more than 1.5 mm, a delamination may easily occur and the heat conductivity in the thickness direction or flexibility may be lower.

A density of the sheet or film comprising the expanded graphite layer (2) is not limited but preferably about 0.80 to 2.2 $g/cm^3$.

This is because that the heat conductivity or strength may be lower when the density is less than 0.80 $g/cm^3$, and the flexibility may be lower when the density is more than 2.2 $g/cm^3$.

The formation comprising the expanded graphite layer (2) (e.g. see FIG. 9) can be obtained by an optional method for containing and pressing the sheet and/or film in a die.

In the above described composite material (1) of the first to fifth embodiments, the clay layer (3) can be formed from a clay based sheet and/or film. As is described later, it is can be formed by applying and/or being soaked into the clay dispersion.

The clay based sheet and/or film includes a sheet and/or film comprising the clay, or a sheet and/or film comprising the clay and additive.

An additive is at least one selected from; celluloid, phenol resin, alkyd resin, urea resin, cellulose acetate, polyvinyl acetate resin, acrylate resin, styrene resin, vinyl chloride resin, melamine resin, polyethylene resin, polyurethane resin, vinylidene chloride resin, polyamide resin, unsaturated polyester, silicon resin, acrylonitrile-styrene resin, fluorine resin, epoxide resin, diallyl phthalate resin, acrylonitrile-butadiene-styrene resin, polyethylene terephthalate, polypropylene, polycarbonate, polyacetal, polyimide, polysulphone, polyphenylene ether, polybutylene terephthalate, polyether sulfone, liquid-crystal polymer, polyphenylene sulfide, polyetherimide.

Hereinafter, one example of the method for manufacturing a clay based sheet and/or film is explained.

First, the clay is added into water or liquid mainly comprising water to regulate the dilute and uniform clay dispersion. The clay may be natural or synthetic smectite, or the mixture thereof.

A solid content in the clay is preferably 3 to 15% by weight. A concentration in the clay dispersion is preferably 0.5 to 10% by weight, more preferably 1 to 3% by weight. In addition, one or more additives described above are added into the clay dispersion if necessary, and the additive dispersed uniformly or dissolved in the clay dispersion.

Next, the clay dispersion is placed horizontally and the clay particle is settled out slowly, and the clay particle is separated from the liquid (dispersion medium) by a solid-liquid separation method, and then a clay thin film is formed.

Finally, the clay thin film is dried under a temperature condition of 110 to 300° C. to obtain the clay based sheet or film used herein.

The solid-liquid separation means in the above method is applied from any one or the combination of the methods such as; centrifugation, filtration, vacuum drying, vacuum freeze-drying and evaporation by heating.

When the evaporation by heating among the above-described methods is used, for example, the clay dispersion pre-deaerated by vacuuming is poured into a flat tray. It is dried with keeping the tray horizontally in a forced fan oven under the temperature condition of 30 to 70° C., preferably 40 to 50° C., from 3 hours to half a day, preferably from 3 to 5 hours. Then the clay based sheet or film is obtained.

The clay based sheet or film manufactured according to the above method has a strength to be used as a self supported film, and has the structure that the lamination layer of the clay particle is orderly oriented.

The phrase "the highly oriented clay particle lamination layer" means to laminate a unit structure layer (thickness of about 1 nm) in the same direction of layer surface to apply a high periodicity in the vertical direction on the layer surface. To obtain such a clay particle orientation, it is required to place the dilute and uniform clay dispersion horizontally and slowly settle out the clay particle. It is also required, for example, to evaporate the liquid (dispersion medium) slowly to form a film.

The clay based sheet or film is the clay obtained from above method has a film thickness of 3 to 100 μm, preferably 3 to 30 μm. As for the gas barrier property, the oxygen permeability rate is less than 0.1 cc/$m^2$·24 hr·atm, the hydrogen permeability rate is less than 0.1 cc/$m^2$·24 hr·atm when the thickness is 30 μm. Gas permeability coefficient of helium, hydrogen, oxygen, nitrogen and air at room temperature is less than $3.2 \times 10^{-11}$ $cm^2 s^{-1} cmHg^{-1}$. The gas barrier property is not decreased after a process of heating for 24 hours at 1000° C.

As for a water shielding property, a coefficient of water shielding is $2 \times 10^{-11}$ cm/s or less. As for an optical transparency, a visible light permeability (500 nm) is 75% or more. An area can be enlarged more than 100×40 cm and the sheet or film has a high heat resistance.

The clay based sheet and/or film is the clay used herein has the structure that the lamination layer of the clay particle is highly oriented and has no pinholes. It is also superior in the flexibility and there is no structural change even in the high temperature from 250 to 600° C. Further, it can be used as a self supported film. Also it can be used under high temperature condition of over 250° C. In addition, it is a dense material with no pinholes and superior in the barrier property against the gas and liquid.

The expanded graphite layer (2) is superior in flexibility, heat conductivity, electrical conductivity, electromagnetic wave shielding property, alkali resistance and water resistance. On the other hand, the clay layer (3) is superior in mechanical strength, heat resistance, corrosion resistance, gas barrier property, acid resistance and insulation property.

Thus, according to the composite materials (1) of the first to fifth embodiments laminated with the clay layer (3) on the expanded graphite layer (2), one layer complements the drawback of the other. As a result, the composite material can be used in the purposes in which a sheet comprising only a single material of layer is unavailable. Therefore, the composite material with high capacity and high versatility can be obtained.

For example, lamination of clay layer allows the present composite material to be used in any field requiring higher gas property due to enhancement of gas barrier property although sole layer of expanded graphite cannot be used in such field.

In addition, lamination of the expanded graphite layer allows the present composite material to be used in any field requiring electromagnetic wave shielding property although sole layer of the clay layer cannot be used in such field.

For example, the composite material (1) of the second embodiment (see FIG. 2) with the clay layers (3) laminated on the both sides of expanded graphite layer (2) has an insulation property on the top surface and bottom surfaces, and has an electrical conductivity and heat conductivity inside. Therefore, it can be used as a base plate of an electric circuit.

Further, according to the composite materials of the fifth embodiment, the expanded graphite layer (2) is coated with the clay layer (3) to avoid the expanded graphite powder from falling off the expanded graphite layer and contaminating around the composite material. It is also possible to avoid sublimating of the expanded graphite under the high temperature environment (650° C. or more).

The sixth embodiment provides highly functional and versatile composite material to be used in any field where the sheet made of either expanded graphite or clay is not preferably used because the structure in which the clay layer (3) enters the expanded graphite layer (2) results in complementary supplement between them.

For example, the expanded graphite is poor in gas barrier property, and the clay is weak in water.

According to the structure including the clay entering into the graphite layer, the expanded graphite covers the clay's weakness in water and the clay covers poor gas barrier property of the expanded graphite.

It is also possible to adjust a mixture rate of clay particle in order to strengthen either property of clay or expanded graphite to achieve optimal property for a given application field.

Further, in the composite materials of first to seventh embodiments described herein, a red phosphorus and an aluminum hydroxide can be added to the graphite (preferably expanded graphite).

Additive amounts of the red phosphorus and the aluminum hydroxide are in the range from 1.5 to 10% by weight with respect to the graphite 100% by weight, respectively.

Thus, adding the red phosphorus and the aluminum hydroxide to the graphite can prevent the graphite (especially expanded graphite) from the oxidation and combustion.

Hereinafter, the method for manufacturing the composite material according to the present invention is explained.

The first example of the method for manufacturing the composite according to the present invention is sticking and laminating the above-described expanded graphite sheet and/or film (the expanded graphite layer (2)) and the clay based sheet and/or film (the clay layer (3)) together.

Using this method, the composite materials in first to forth embodiments described above (see FIGS. 1 to 4) can be obtained.

There are some methods for sticking the expanded graphite sheet and/or film and the clay based sheet and/or film. These methods are, for example, a cold and/or hot press (see FIG. 10), a mill roll (see FIG. 11), adhesive (see FIG. 12) and the like.

Figure 10:
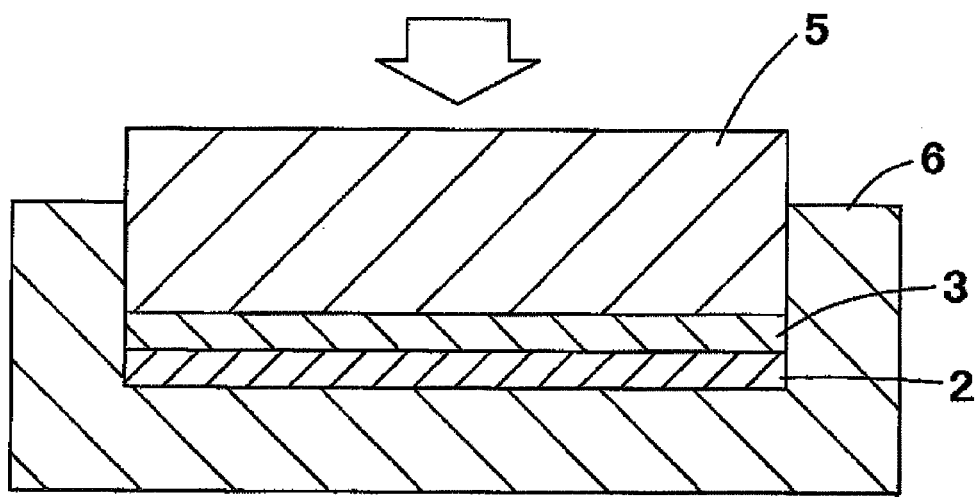
FIG. 10 is a schematic diagram showing the method using a cold and/or hot press in the first example of a method for manufacturing a composite material of the present invention.

FIG. 10 is a schematic diagram showing that the expanded graphite sheet and/or film (the expanded graphite layer (2)) and the clay based sheet and/or film (the clay layer (3)) are laminated, and compressed with a stamping die comprising a male die and a female die to be integrated.

Figure 11:
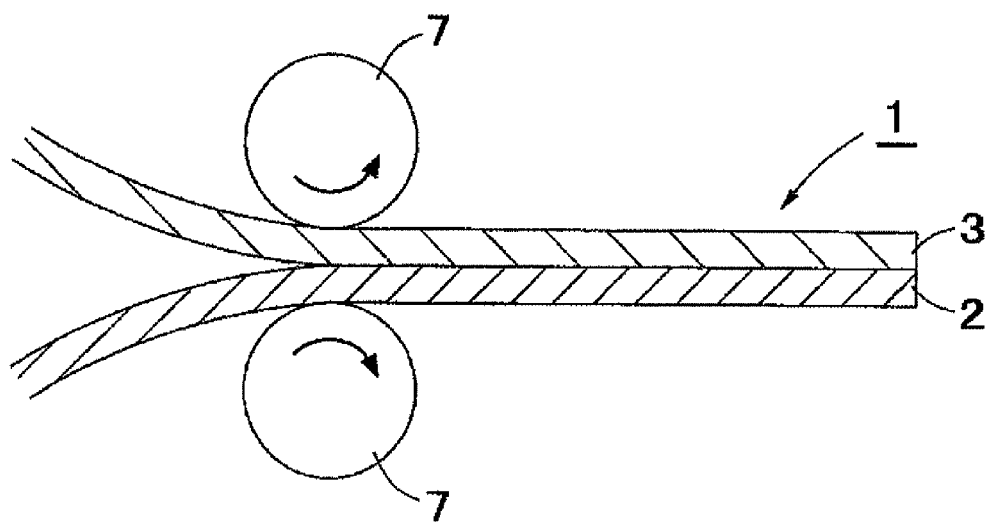
FIG. 11 is a schematic diagram showing a method using a rolling mill in the first example of a method for manufacturing a composite material of the present invention.

FIG. 11 is a schematic diagram showing that the expanded graphite sheet and/or film (the expanded graphite layer (2)) and the clay based sheet and/or film (the clay layer (3)) are laminated and rolled with the mill roll (7) to be integrated.

Figure 12:
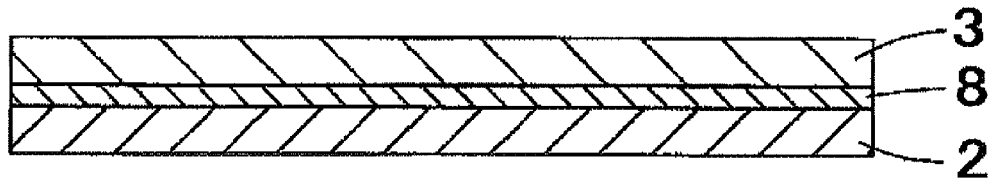
FIG. 12 is a schematic diagram showing a method using an adhesive in the first example of a method for manufacturing a composite material of the present invention.

FIG. 12 is a schematic diagram showing that the expanded graphite sheet and/or film (the expanded graphite layer (2)) and the clay based sheet and/or film (the clay layer (3)) are laminated and integrated by the adhesive (8).

The second example of the method for manufacturing the composite material according to the present invention is applying the clay dispersion, which the clay particle is dispersed therein, to the above-descried expanded graphite sheet and/or film or the formation (the expanded graphite layer (2)) obtained thereof.

As for the clay dispersion, the above-described clay dispersion can be used. For example, the clay dispersion including one or more of natural clay, synthetic clay and modified clay can be exemplified as well as water or the organic solvent.

Using this method, the composite materials in first and second embodiments described above (see FIGS. 1 and 2) can be obtained.

Figure 13:
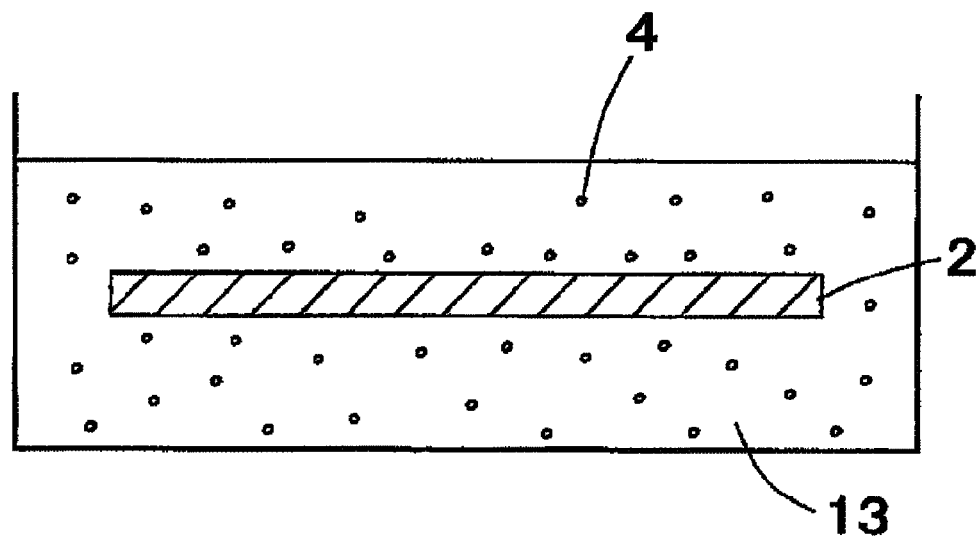
FIG. 13 is a schematic diagram showing the third example of a method for manufacturing a composite material of the present invention.

The third example of the method for manufacturing the composite material according to the present invention is soaking the expanded graphite sheet and/or film or the formation obtained thereof (the expanded graphite layer (2)) in the clay dispersion (13) in which the clay particle (4) is dispersed (see FIG. 13).

Using this method, the composite materials in fifth and sixth embodiments described above (see FIGS. 5 and 6) can be obtained.

The composite material in seventh embodiment described above (see FIG. 7) can be obtained by combining this method and the method of first or second example.

Figure 14:
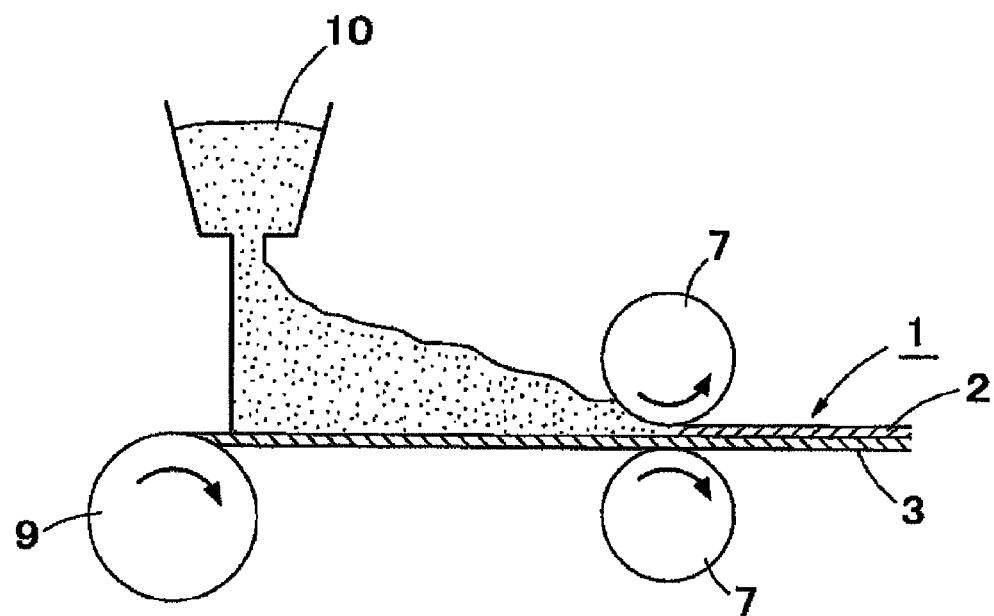
FIG. 14 is a schematic diagram showing the fourth example of a method for manufacturing a composite material of the present invention.

The fourth example of the method for manufacturing the composite material according to the present invention is winding off the clay based sheet and/or film (the clay layer (3)) from a wind-up roller (9), transferring the sheet and/or film, supplying the expanded graphite powder (10) on the surface of the sheet and/or film continuously, and forming the expanded graphite powder (10) into a sheet-like or film-like form on the surface of the clay based sheet or film by a mill roll to integrate the expanded graphite layer (2) and the clay layer (3) (see FIG. 14).

Using this method, the composite material in first embodiment described-above (see FIG. 1) can be obtained.

Figure 15:
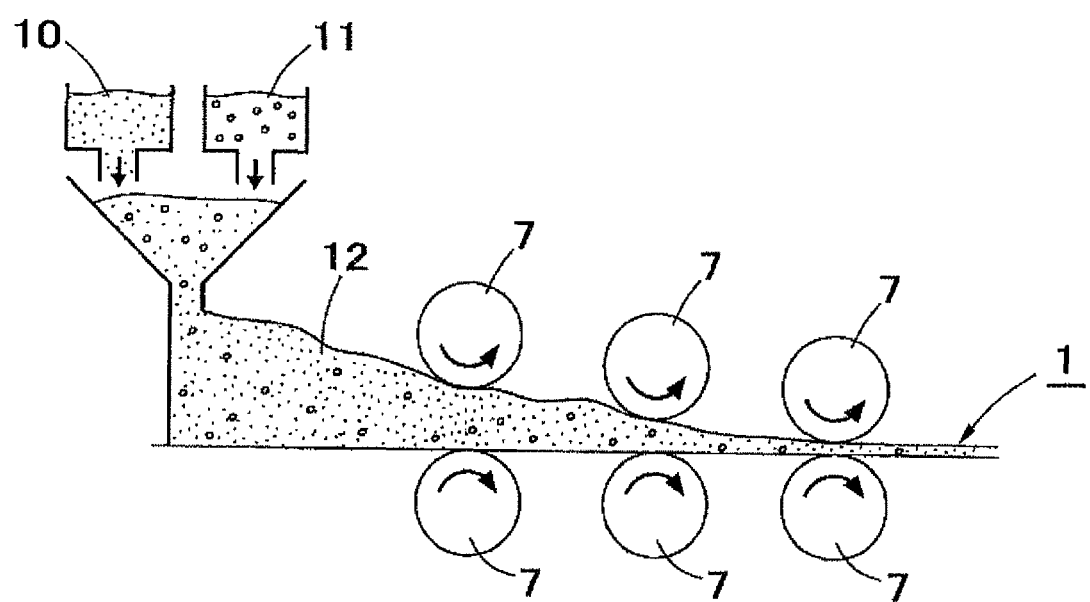
FIG. 15 is a schematic diagram showing the fifth example of a method for manufacturing a composite material of the present invention.

The fifth example of the method for manufacturing the composite according to the present invention is mixing the expanded graphite powder (10) and the clay particle (11), and passing and rolling the mixture (12) through multiple-stage rolling mills (7) to form a sheet like form (see FIG. 15).

Using this method, the composite material in six embodiment described above (see FIG. 6) can be obtained.

It is also possible for the composite materials in the above first to seventh embodiments to be laminated with other disparate materials such as a synthetic resin sheet, metal sheet, ceramic sheet and the like.

It is possible for the film-like or sheet-like composite material obtained by the method described above to be used as a gasket, packing, heat sink and the like, by further forming into a given shape with a die and the like.

A gasket or packing according to the present invention is obtained by forming the film-like or sheet-like composite material obtained by the above-described methods into a given shape with a die and the like.

The gasket or packing according to the present invention is not limited to, but a sheet gasket, sphere gasket, spiral gasket and the like are exemplified as the gasket, and a braided packing is exemplified as the packing.

Figure 16:
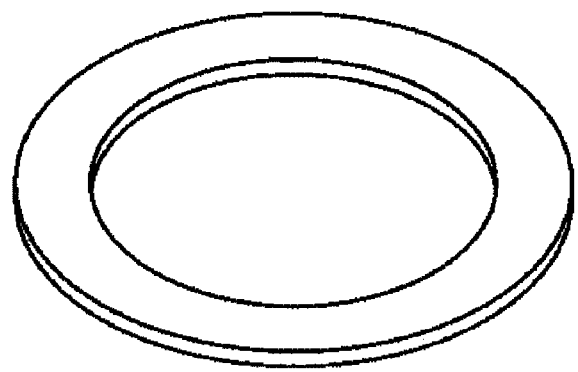
FIG. 16 shows one example of a gasket or packing of the present invention. (a) is an external view, (b) is a longitudinal sectional view, and (c) and (d) are longitudinal sectional views of a modified version.
Figure 16:
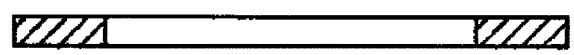
Figure 16:
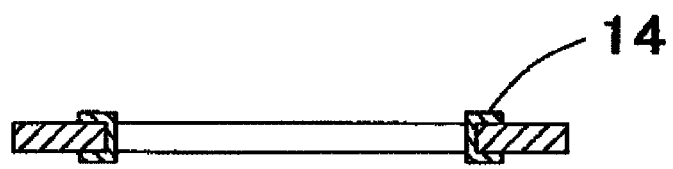
Figure 16:

FIG. 16 shows one example of the gasket or packing according to the present invention. (a) is an external view, (b) is a longitudinal sectional view, and (c) and (d) are longitudinal sectional views of the modified version.

A flat ring-like gasket or packing shown is made from the film-like or sheet-like composite materials obtained from the above-described method.

FIG. 16 (c) shows a sheet gasket subjected to a grommet processing.

Specifically, an inner edge surface of the sheet gasket and portions of the top and bottom surfaces consecutive to the inner edge surface are covered with a thin metal sheet (14) having the thickness of 0.05 to 0.3 mm bending into like a channel steel shape. Also, an outer edge surface of the sheet gasket and portions of the top and bottom surfaces consecutive to the outer edge surface may be covered with a thin-metal sheet as well as the inner edge surface (not shown).

The above-described grommet processing can strengthen the inner and outer edge surfaces of the sheet gasket. It also can keep a stable sealing property for a longtime so that it can prevent a leak of a fluid.

FIG. 16 (d) shows a gasket or packing of which whole surface is covered with a water resistance coating (15).

A coating process for the water resistance coating can be exemplified such as; fluorine system membrane, silicon system membrane, polysiloxane membrane, fluorine resin-containing organopolysiloxan membrane, acrylate resin membrane, vinyl chloride resin membrane, polyurethane resin membrane, ethylcellulose resin membrane, high water repellent plating membrane, metal evaporated membrane, carbon evaporated membrane or the like.

By applying the water resistance coating described above, the coating material acts as a binding agent and therefore the clay can be prevented from being washed away by contacting with aqueous fluid. Thus the water resistance property and sealing property of the gasket or packing are improved.

Figure 17:
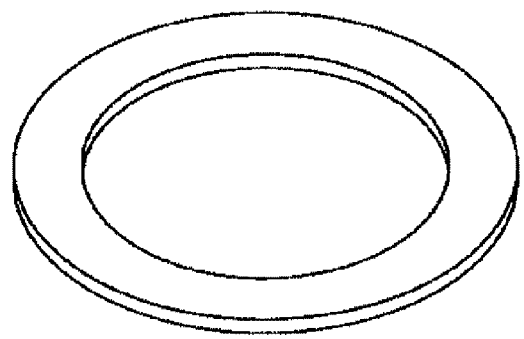
FIG. 17 shows one example of a gasket or packing including a thin metal sheet. (a) is an external view, (b) is a longitudinal sectional view, and (c) to (e) are longitudinal sectional views of a modified version.
Figure 17:
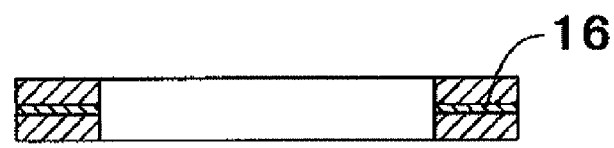
Figure 17:
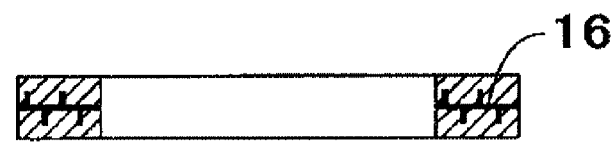
Figure 17:
Figure 17:
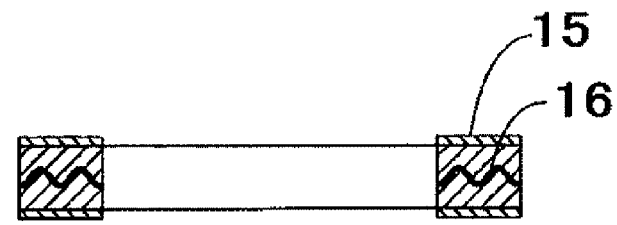

FIG. 17 shows an another example of the gasket or packing according to the present invention. (a) is an external view, (b) is a longitudinal sectional view, and (c) to (e) are longitudinal sectional views of the modified version.

The gasket or packing shown is also the film-like or sheet-like composite materials obtained from the above-described method formed into a flat ring-like material with a die and the like.

FIG. 17 shows a gasket or packing including a thin metal film (16).

As shown, the thin metal sheet (16) may be sandwiched between the formations comprising the composite material of the present invention, or may be laminated on the front and/or the back of the formation comprising the composite material.

For the thin metal sheet (16), it is preferable to use a stainless steel with a high corrosion resistance.

Such structure containing the thin metal sheet results in enhancement of mechanical strength.

FIG. 17 (b) shows the gasket or packing including the flat thin metal sheet (16). FIG. 17 (c) shows the gasket or packing including the thin metal sheet (16) having projections up and down. The thickness of these thin metal sheets is preferably about 0.05 to 5 mm.

FIG. 17 (d) shows the gasket or packing including the thin metal sheet (16) having a saw blade-like cross section. The thickness of the thin metal sheet (16) is preferably about 1.0 to 2.0 mm, and the thicknesses of the composite materials which the thin metal sheet (16) is sandwiched therebetween are about 0.5 to 2.0 mm respectively.

FIG. 17 (e) shows the gasket or packing including the thin metal sheet (16) having a curved crimp cross section as well as front and back surfaces coated with the coating material (15). In this case, the thickness of the thin metal sheet (16) is about 0.5 to 1.5 mm, and the thickness of the composite material which the thin metal sheet (16) is sandwiched therebetween is about 0.5 to 1.5 mm respectively.

Figure 18:
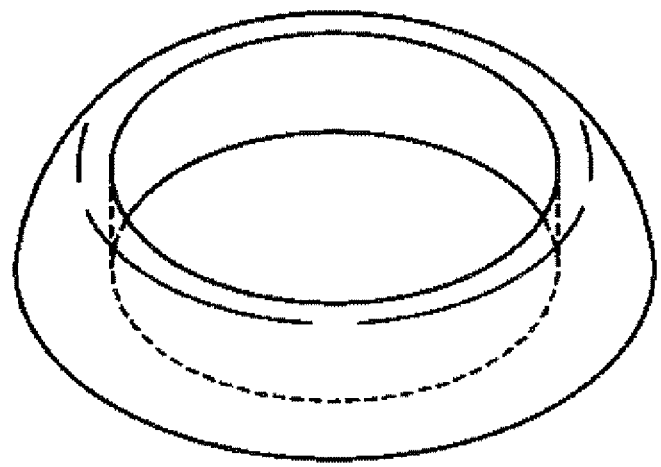
FIG. 18 shows a sphere gasket which is one example of a gasket or packing of the present invention. (a) is an external view, and (b) is a longitudinal sectional view.
Figure 18:

FIG. 18 shows a sphere gasket which is one example of the gasket or packing according to the present invention. (a) is an external view and (b) is a longitudinal sectional view.

The sphere gasket according to the present invention may comprise boron nitride, talc, and tetrafluoroethylene resin in a sphere surface (a part along the surface formed spherically) to improve the heat resistance property.

EXAMPLES

Hereinafter, a sheet gasket and a sphere gasket comprising a composite material of the present invention is explained by presenting examples in order to clearly show the effects of the present invention. However, the present invention is not limited to these examples as shown below.

1. Example of a Sheet Gasket
(Sample Preparation)

A graphite clay composite material comprising a natural clay and an expanded graphite was formed to manufacture a sheet gasket (JPI 50A: outside diameter Φ104 mm, inside diameter Φ61.5 mm, thickness 3 mm, area 54.09 cm$^2$). The composite material had a cross section structure shown in FIG. 5, and the sheet gasket had a structure shown in FIGS. 16 (a) and (b). The obtained sheet gasket was designated as Example.

(Sealing Property Test)

The sheet gasket of Example was disposed between two flanges, and it was tightened by bolts (outside diameter Φ1.6 cm, number: 4). While keeping the condition, an internal pressure (Helium gas pressure) 0.98 MPa (10 kgf/cm$^2$) was added. Then, a tightening surface pressure and a leakage rate of helium gas were measured.

The results are shown in Table 1

TABLE 1

| tightening surface pressure (MPa) | leakage rate(mL/min) |
| --- | --- |
| 9.80 | 7.8 |
| 19.6 | 2.75 |
| 29.4 | 1.62 |
| 39.2 | 0.85 |

As shown in Table 1, the leakage rate of helium gas was 1.62 mL/min or less when the tightening surface pressure was 29.4 MPa (300 kgf/cm$^2$).

The result showed that the sheet gasket of the present invention excelled in the sealing property.

2. Example of a Sphere Gasket
(Sample Preparation)

A graphite clay composite material comprising a natural clay and an expanded graphite was formed to manufacture three sphere gaskets (outside diameter Φ70 mm, inside diameter Φ53.5 mm, height 16 mm). The composite material had a cross section structure shown in FIG. 5, and the sphere gasket had a structure shown in FIG. 18. The obtained sphere gaskets were designated as Example. The sphere gaskets of Example comprise boron nitride, talc and tetrafluoroethylene in sphere surfaces (a part along the surface formed spherically). These gaskets comprise the boron nitride and the talc in a weight ratio of 100:0, 50:50 and 10:90, respectively.

On the other hand, three sphere gaskets comprising only the expanded graphite were manufactured. These sphere gaskets had the same shapes as Example. The obtained sphere gaskets were designated as Comparative example.

(Heat Resistance Property Test)

The sphere gaskets of Example and Comparative example were heated in an electric furnace for 24 hours at 800° C. The weights before and after the heating were measured to calculate a weight decrease rate. The results are shown in Table 2.

TABLE 2

|  | Example | Comparative example |
|---|---|---|
| before heating (g) | 60 | 55 |
| after heating (g) | 53.5-57.0 | 36.3-41.8 |
| weight decrease rate (%) | 5-11 | 24-34 |

As shown in Table 2, the sphere gasket of Example had a weight decrease rate of 11% or less. On the contrary, the sphere gasket of Comparative example had a weight decrease rate of 34% or less. The results showed that the sphere gasket of the present invention had the higher heat resistance property than the conventional sphere gasket.

(Sealing Property Test)

Figure 19:
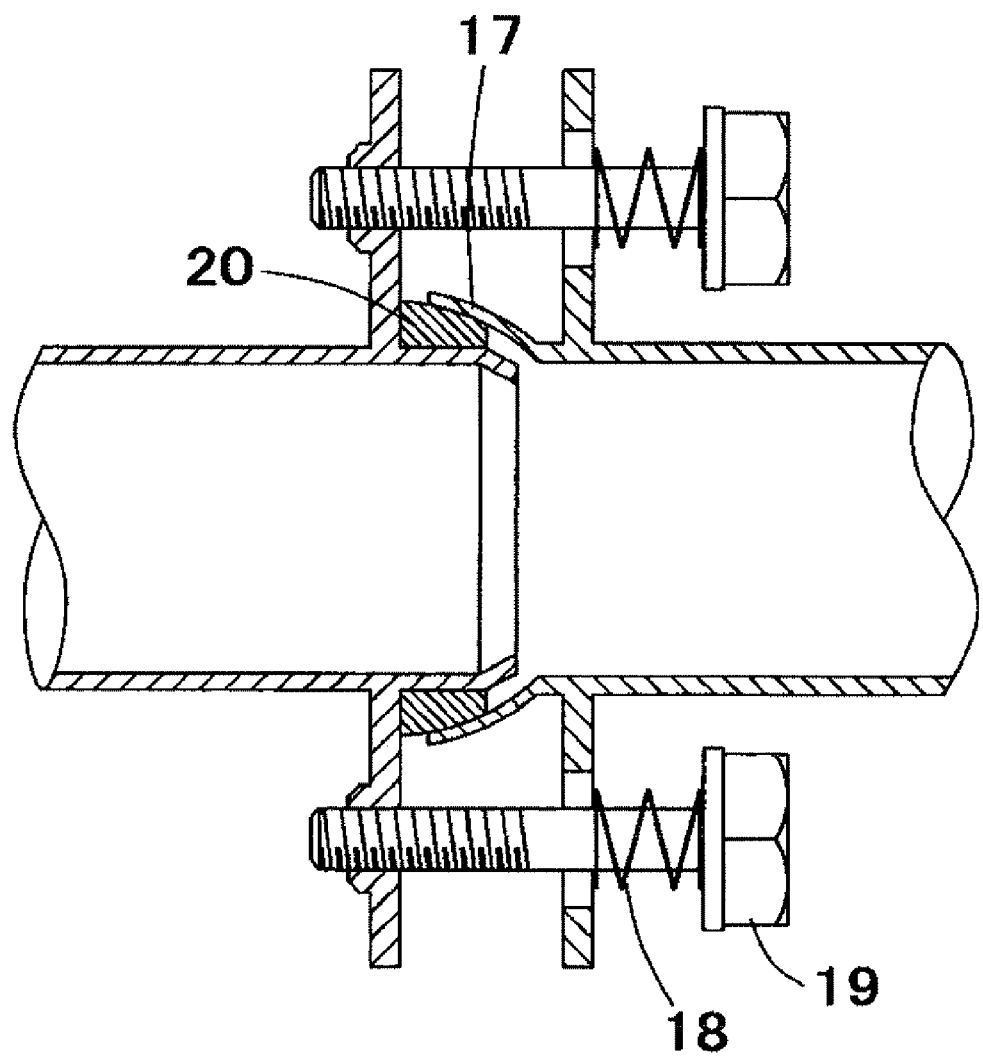
FIG. 19 describes a method for testing a sphere gasket of the present invention.

As shown in FIG. 19, the sphere gasket (20) of Example was disposed between flanges (stainless-steel) respectively formed in the vicinity of the tip of two pipes (stainless-steel, outside diameter Φ53 mm), and it was tightened by a bolt (19) via a spring (18) with a tightening load of 588.4N (60 kgf). The inside of the pipe was heated for 24 hours to rise the temperature of the flange sphere surface (17) up to 600 to 700° C. by a gas burner. Subsequently, a movable part of the flange sphere was repeatedly slid for 10 times in the same movable area as before the heating, and then an internal pressure (air pressure) of 19.6 kPa (0.2 kgf/cm$^2$) was added to the sphere gasket. Then, a leakage rate of air was measured.

As a result, the leakage rate of air was 0.5 L/30 sec or less, more specifically 0.03 to 0.035 L/30 sec.

The result showed that the sphere gasket of the present invention excelled in a heat-resistant sealing property.

(Anti-Seizure Property Test)

The sphere gaskets of Example and Comparative example were heated under the same condition as the above-described sealing property test.

Then, the two pipes were folded at the junction of the flanges. The sphere gasket of Example could be folded at 10 times repeatedly. The sphere gasket of Comparative example could not be folded because the sphere surface was seized and stuck to the surface of the flange.

The result showed that the sphere gasket of the present invention excelled in an anti-Seizure property compared to the conventional sphere gasket.

The present invention is applied to the various usages in a wide fields including a field that has a difficulty in applying the existing graphite sheet such as; sealing material such as joint sheet, gasket, packing and the like used for a connection part of pipes and the like in power plants and chemical plants, heat-release sheet, electromagnetic wave shielding material, sound-proof sheet and the like.

What is claimed is:

1. A composite material comprising mainly an expanded graphite and a clay,
   wherein the clay is laminated on an expanded graphite layer,
   wherein the expanded graphite is a sheet and/or film or a formation obtained from the sheet and/or film,
   wherein the expanded graphite is wholly coated with the clay.

2. The composite material according to claim 1,
   wherein the clay is at least one selected from mica, vermiculite, montmorillonite, beidellite, saponite, hectorite, stevensite, magadiite, ilerite, kanemite, illite, sericite or nontronite.

3. The composite material according to claim 1,
   wherein an expanded graphite layer and/or a clay layer include 2 or more lamination layers.

4. The composite material according to claim 1,
   wherein the clay is at least one selected from natural clay, synthetic clay or modified clay.

5. The composite material according to claim 4,
   wherein the modified clay includes one selected from quaternary ammonium cation, quaternary phosphonium cation, imidazolium cation or pyridium cation as an organic cation.

6. The composite material according to claim 5,
   wherein a composition rate of the organic cation in the modified clay is less than 30% by weight.

7. The composite material according to claim 4,
   wherein the modified clay is formed by reacting the clay with a silylation agent.

8. The composite material according to claim 7,
   wherein a composition rate of the silylation agent in the clay and silylation agent is less than 30% by weight.

9. The composite material according to claim 4, comprising;
   a sheet and/or film comprising at least one expanded graphite sheet and/or film and at least one clay based sheet and/or film laminated on said expanded graphite, or a formation obtained from these.

10. The composite material according to claim 9,
    wherein the clay based sheet and/or film includes the clay, or the clay and an additive.

11. The composite material according to claim 10,
    wherein the additive is at least one selected from celluloid, phenol resin, alkyd resin, urea resin, cellulose acetate, polyvinyl acetate resin, acrylate resin, styrene resin, vinyl chloride resin, melamine resin, polyethylene resin, polyurethane resin, vinylidene chloride resin, polyamide resin, unsaturated polyester, silicon resin, acrylonitrile-styrene resin, fluorine resin, epoxide resin, diallyl phthalate resin, acrylonitrile-butadiene-styrene resin, polyethylene terephthalate, polypropylene, polycarbonate, polyacetal, polyimide, polysulphone, polyphenylene ether, polybutylene terephthalate, polyether sulfone, liquid-crystal polymer, polyphenylene sulfide, polyetherimide.

12. The composite material according to claim 1,
    wherein a red phosphorus and an aluminum hydroxide are added in the range from 1.5 to 10% by weight with respect to graphite 100% by weight, respectively.

13. A clay dispersion for manufacturing the gasket or packing according to any of claims 1, 4, 2, 5, 7, 6, 8, 3, 9, 10, 11 or 12, wherein the clay is uniformly dispersed in a solvent mainly comprising water.

14. The clay dispersion according to claim 13, wherein the additive is uniformly dispersed or dissolved.

15. The clay dispersion according to claim 14, wherein the clay has a solid content of 3 to 15% by weight.

16. A gasket or packing comprising the composite material according to any of claim 1, 4, 2, 5, 7, 8, 3, 9, 10, 11, or 12.

17. The gasket or packing according to claim 16, further comprising a water-resistance coating.

18. The gasket or packing according to claim 16, wherein the gasket is a spiral gasket.

19. The gasket or packing according to claim 16, wherein the packing is a braided packing.

20. The gasket or packing according to claim 16, further comprising a thin metal sheet.

21. The gasket or packing according to claim 20, wherein the sheet metal is a stainless-steel and in thickness of 0.05 to 5 mm.

22. The gasket or packing according to claim 16, wherein the gasket is a sheet gasket.

23. The gasket or packing according to claim 22, wherein the gasket or packing is subjected to a grommet processing.

24. The gasket or packing according to claim 22, wherein a leakage rate of helium gas is 1.62 mL/min or less after the steps of:
    disposing the sheet gasket (JPI 50A: outside diameter Φ104 mm, inside diameter Φ61.5 mm, thickness 3 mm) between two flanges;
    tightening the sheet gasket with a tightening surface pressure of 29.4 MPa; and
    pressurizing the sheet gasket with an internal pressure of 0.98 MPa.

25. The gasket or packing according to claim 16, wherein the gasket is a sphere gasket.

26. The gasket or packing according to claim 25, wherein the sphere surface includes a boron nitride, a talc and a tetrafluoroethylene.

27. The gasket or packing according to claim 25, wherein a weight decrease rate is 11% or less after heating for 24 hours at 800° C.

28. The gasket or packing according to claim 25, wherein a leakage rate of air is 0.5 L/30 sec or less after the steps of:
    disposing the sphere gasket (outside diameter Φ70 mm, inside diameter Φ53.5 mm, height 16 mm) between flanges respectively formed in the vicinity of the tip of two pipes (stainless-steel, outside diameter Φ53 mm);
    tightening the sphere gasket with a tightening load of 588.4N;
    heating the inside of the pipe for 24 hours to rise the temperature of the flange sphere surface up to 600 to 700° C.,
    sliding a movable part of the flange sphere surface for 10 times in the same movable area as before the heating repeatedly; and
    pressurizing the sphere gasket with an internal pressure of 19.6 kPa.

29. The gasket or packing according to claim 25, wherein the two pipes are able to be folded at the junction of flanges after the steps of:
    disposing the sphere gasket (outside diameter Φ70 mm, inside diameter Φ53.5 mm, height 16 mm) between flanges formed in the vicinity of the tip of two pipes (stainless-steel, outside diameter Φ53 mm) respectively;
    tightening the sphere gasket with a tightening load of 588.4N; and
    heating the inside of the pipe for 24 hours to rise the temperature of the flange sphere surface up to 600 to 700° C.

* * * * *

UNITED STATES PATENT AND TRADEMARK OFFICE
CERTIFICATE OF CORRECTION

PATENT NO. : 8,647,744 B2  
APPLICATION NO. : 12/296107  
DATED : February 11, 2014  
INVENTOR(S) : Takeo Ebina et al.

Page 1 of 1

It is certified that error appears in the above-identified patent and that said Letters Patent is hereby corrected as shown below:

Title Page

(73) Assignees should be corrected as follows:

change

-- National Institute of Advanced Industrial Science and Technology -- to

"National Institute of Advanced Industrial Science and Technology";  
"Japan Matex Co., Ltd."

Signed and Sealed this  
Seventeenth Day of March, 2015

Michelle K. Lee  
*Director of the United States Patent and Trademark Office*